Feb. 13, 1968     O. C. SCAGGS     3,368,699
PIPE HANDLING METHODS AND APPARATUS

Filed Sept. 17, 1965     3 Sheets-Sheet 1

INVENTOR.
ORVILLE C. SCAGGS
BY
Dunlap and Laney
ATTORNEYS

Feb. 13, 1968  O. C. SCAGGS  3,368,699
PIPE HANDLING METHODS AND APPARATUS
Filed Sept. 17, 1965  3 Sheets-Sheet 2

INVENTOR.
ORVILLE C. SCAGGS
BY
Dunlap and Laney
ATTORNEYS

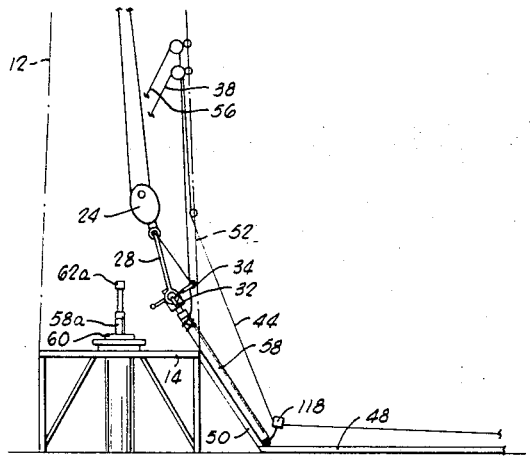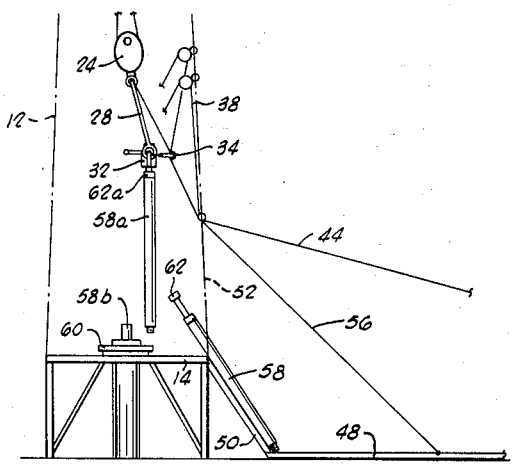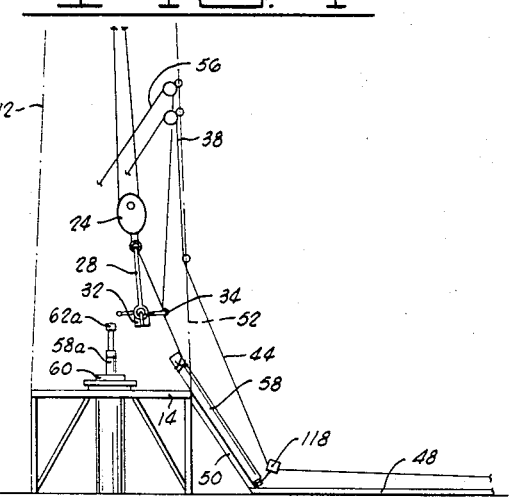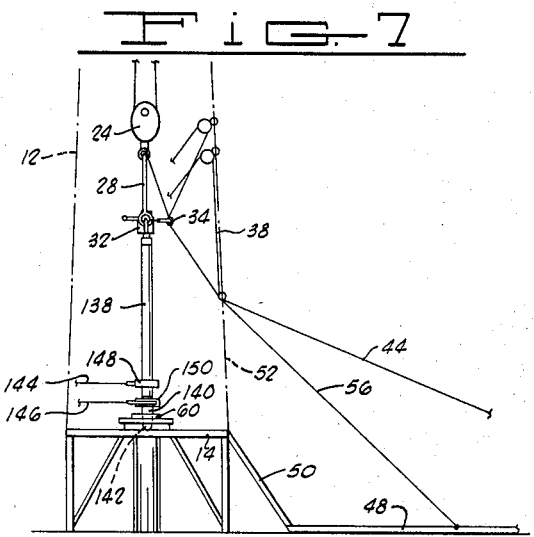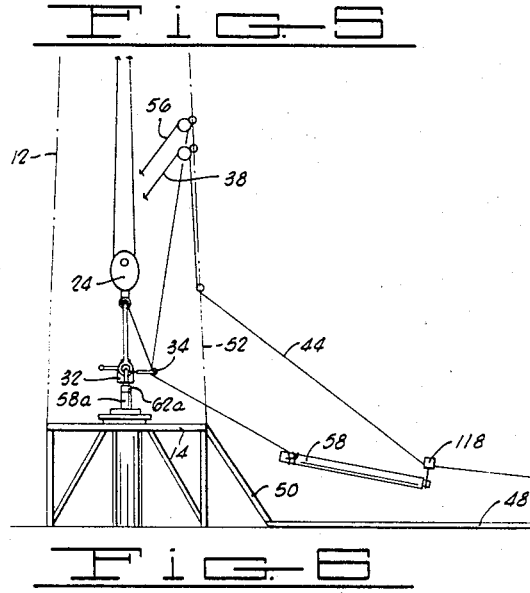

United States Patent Office 3,368,699
Patented Feb. 13, 1968

3,368,699
PIPE HANDLING METHODS AND APPARATUS
Orville C. Scaggs, 918 W. Choctaw,
Lindsey, Okla. 73052
Filed Sept. 17, 1965, Ser. No. 488,042
13 Claims. (Cl. 214—2.5)

ABSTRACT OF THE DISCLOSURE

A method and apparatus for handling pipe, particularly drill collars in a well drilling rig, wherein the elevator assembly, including an adaptive guide tool, is employed to remove a drill collar section from the string to a standby position; whereupon the elevator can be relatched to the next drill collar in the string while the guide tool and associated rigging is employed to move the drill collar section from the standby position outward onto the pipe rack thereby avoiding any dragging contact with the pipe rack and storage equipment.

---

This invention relates generally to improved methods and apparatus for handling pipe and the like. More particularly, but not by way of limitation, this invention relates to an improved method and apparatus for handling drill collars and the like on a well drilling rig.

One aspect of this invention contemplates an improved guide for use in handling pipe on a drilling rig. The improved guide includes a generally U-shaped frame member; a pair of spaced, parallel plates having one end of each plate connected with the frame member near the bottom of the U-shape; a pair of angularly disposed members extending between the ends of the plates and the ends of the frame member; a pulley disposed between and journaled in the plates; and, a pair of chains, each of the chains having both ends connected with a respective one end of the frame member.

In another aspect, the invention contemplates an improved method of handling pipe on a well drilling rig including a derrick, a traveling block flexibly suspended in the derrick, an elevator, support means suspending the elevator from the traveling block, a horizontally disposed pipe rack adjacent the derrick, an inclined ramp extending from the rack to the derrick, and a cable suspended in the derrick having one end connected with a powered winch. The improved method includes the steps of: connecting the guide to the support means in operable engagement with the cable; connecting the free end of the cable to the pipe rack; applying tension in the cable while lowering the traveling block so that the block and elevator move toward the pipe rack; latching the elevator on a pipe disposed on the ramp; holding tension in the cable while raising the traveling block, elevator and pipe; and, releasing tension in the cable slowly to permit the traveling block, elevator and pipe to move relatively away from the pipe rack.

One object of the invention is to provide an improved method of handling extremely heavy pipe on a drilling rig.

Another object of the invention is to provide improved apparatus for handling pipe on a drilling rig or the like.

Still another object of the invention is to provide faster and safer apparatus and methods for handling drill collars and the like on a drilling rig.

A further object of the invention is to provide improved apparatus useful on a drilling rig having a traveling block flexibly suspended from the upper end of a vertically extending derrick to move the traveling block and pipe suspended thereby to and from the center of the derrick to one side thereof.

An additional object of the invention is to provide improved methods and apparatus for moving heavy drill collars and the like from the center of the rig floor to and from a horizontally disposed pipe rack located adjacent the drilling rig.

The foregoing and additional objects and advantages of the invention will become more apparent as the following detailed description is read in conjunction with the accompanying drawings wherein like reference characters denote like parts in all views and wherein:

FIG. 4 is a partial schematic view of the rig of FIG. 1 illustrating one step in a method performed in accordance with the invention;

FIG. 5 is a view similar to FIG. 4, but showing an additional step in the method of the invention;

FIG. 6 is a schematic view similar to FIG. 4, but showing still another step in the method of the invention;

FIG. 7 is a schematic view similar to FIG. 4, but illustrating still another method also performed in accordance with the invention;

FIG. 8 is also a schematic view similar to FIG. 4, but illustrating another use of the apparatus constructed in accordance with the invention;

Figure 1:
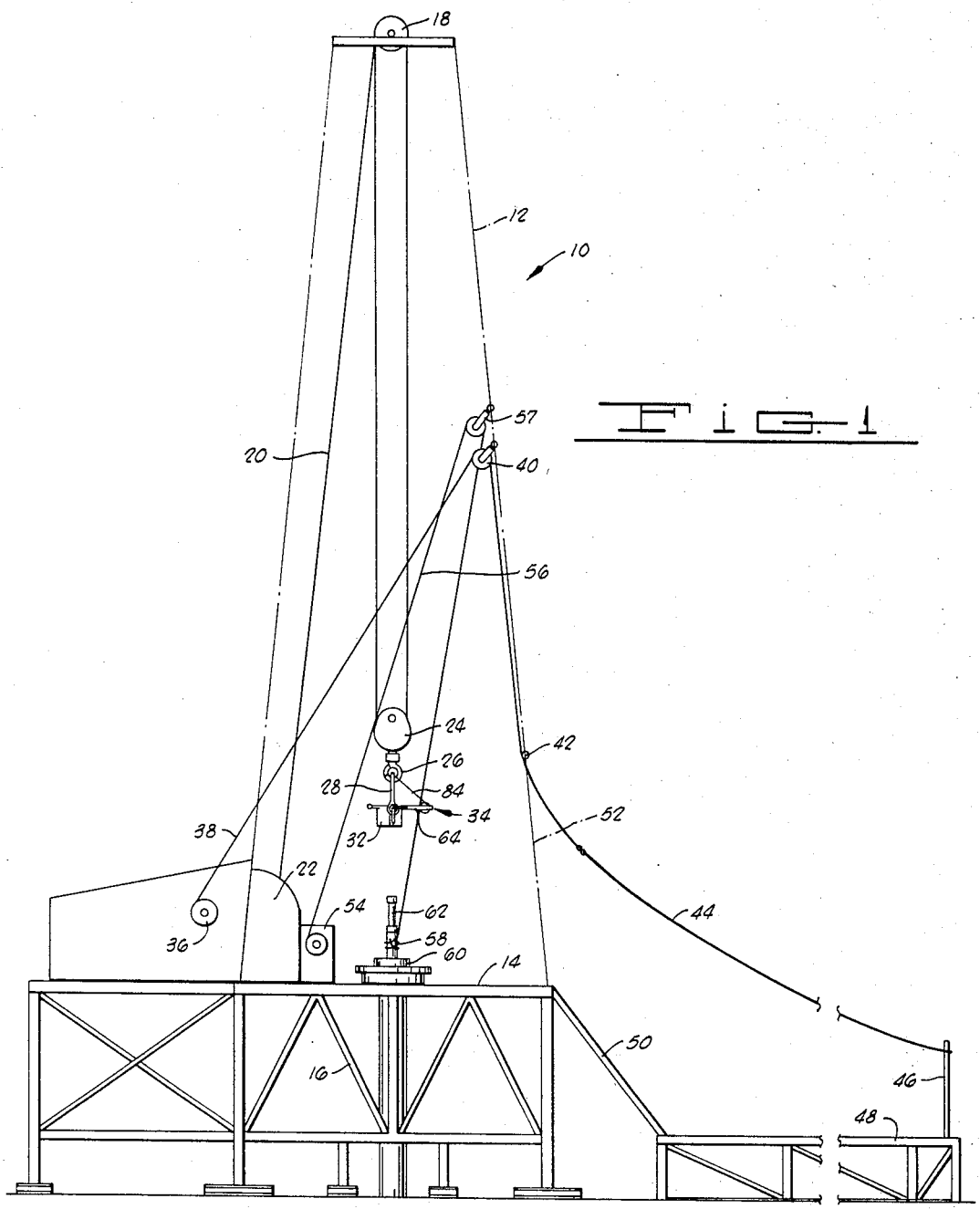
FIG. 1 is a schematic illustration of a drilling rig showing the derrick, pipe rack, traveling block, elevator, and the upper end of a section of drill collar supported in the center of the rig floor.

Referring to the drawings and to FIG. 1 in particular, shown therein and generally designated by the reference character 10 is a drilling rig. The drilling rig 10 includes a derrick 12 (shown in dash lines in FIG. 1) having a rig floor 14 and a supporting substructure 16. The top of the derrick 12 supports a crown block 18 that generally includes a plurality of pulleys (only one is shown) supporting a cable 20 that extends from a powered draw works 22 mounted on the rig floor 14 over the pulleys in the crown block 18 to flexibly suspend a traveling block 24 in the derrick 12.

The traveling block 24 includes a hook 26 that is pivotally connected therewith. Suspended from the hook 26 is a pair of bails 28 and 30 (see FIG. 2). An elevator or latching device 32 is suspended from the eyes of the lower end of the bails 28 and 30 as is more clearly shown in FIG. 2.

A guide, generally designated by the reference character 34, is connected with the bails 28 and 30 and with the hook 26 as will be described more fully hereinafter. A powered cathead or winch 36 is located on the draw works 22 and has a cable or catline 38 extending upwardly into the derrick 12 to a snatch block or pulley 40 suspended in the derrick 12. As may be seen clearly in FIG. 1, the bight portion of the catline 38 extends over the pulley 40 and the opposite end of the catline 38 is illustrated as being connected with a trolley line 44 after passing over a roller 42.

The trolley line 44 extends from its connection with the end of the catline 38 to a short mast 46 that extends upwardly from the end of a horizontally disposed pipe rack 48. The pipe rack 48 is of sufficient length (approximately 30 feet) to support the pipe used in drilling the well.

An inclined ramp 50 extends from the rig floor 14 to the pipe rack 48 to facilitate the movement of the pipe used in drilling the well from the rig floor to the pipe rack 48 and vice versa. It should be pointed out, that in the larger drilling rigs, the vertical distance from the rig floor to the surface of the ground may be 20–30 feet and that the vertical height of the top of the pipe rack 48 above the ground will be only 3 or 4 feet.

Although not shown, it will be understood by those skilled in the well drilling art that a standard derrick has an opening or V-door 52 extending through the derrick structure on the opposite side thereof from the draw works 22 to provide access to the rig floor 14 from the pipe rack 48. As illustrated in FIG. 1, the end of the catline 38 attached to the trolley line 44 extends through the V-door 52.

On most of the larger drilling rigs, and as illustrated in FIG. 1, a powered utility winch 54 is located in a convenient position on the rig floor 14. A cable 56, which will be referred to hereinafter as a snubbing line, extends from the winch 54 through a second snatch block or pulley 57 that is suspended in the derrick 12. The opposite end of the snubbing line 56 is illustrated as being secured to the upper end of a drill collar 58 that is suspended in a rotary table 60 by means well known to those skilled in the well drilling art.

As is also shown in FIG. 1, an adapter or sub 62 has been screwed into the upper end of the drill collar 58 so that the elevator 32 can be connected in a lifting relationship with the drill collar 58 as will be explained more fully hereinafter. The rotary table 60 is arranged so that a device commonly referred to as slips (not shown), can be wedged between the drill collar 58 and the rotary table 60 to suspend the pipe used in drilling the well therein.

Figure 2:
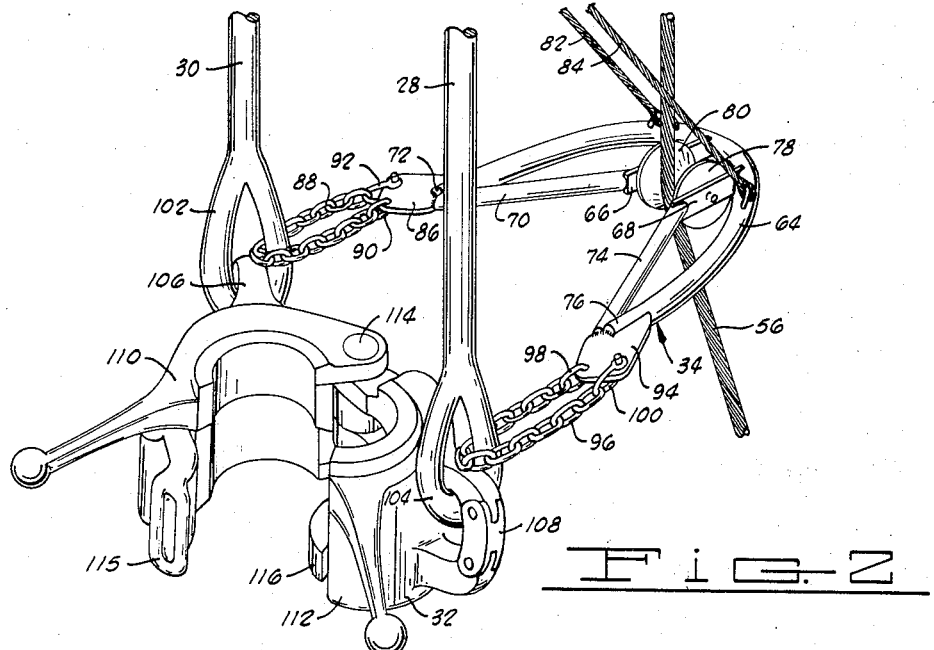
FIG. 2 is an enlarged pictorial view of the elevator and of a guide means constructed in accordance with the invention.

FIG. 2 illustrates in more detail the construction of the guide 34. As shown therein, the guide 34 includes a generally U-shaped frame member 64.

A pair of plates 66 and 68 have one end attached to the body of the U-shaped frame member 64 and are disposed in generally parallel spaced relation. The other end of the plate 66 is attached to angularly disposed member 70. The opposite end of the member 70 is connected with an end 72 of the U-shaped frame member 64. An angularly disposed member 74 has one end connected with the free end of the plate 68 and extends therefrom into connection with a second end 76 of the U-shaped frame member 64.

A pulley or sheave 78 is disposed between the parallel plates 66 and 68. The pulley 78 is journaled in the plates 66 and 68 and is provided with a concave peripheral portion 80 sized to receive the snubbing line 56.

A pair of relatively short cables 82 and 84 are secured to the U-shaped frame member 64 relatively near the plates 66 and 68. As can be seen in FIG. 1, the cable 84 has its other end connected with either the hook 26 carried by the traveling block 24 or to the upper eye (not shown) of the bail 28. Although not shown, it should be understood that the cable 82 has its upper end attached either to the hook 26 or to the upper eye in the bail 30. The cables 82 and 84 are provided to support the U-shaped frame member 64 in a substantially perpendicular relationship relative to the bails 28 and 30.

A bracket 86 is attached to the end 72 of the U-shaped frame member 64 to facilitate the attachment of a chain 88 thereto. As clearly shown in FIG. 2, one end 90 of the chain 88 is permanently secured to the bracket 86 and the opposite end 92 thereof is arranged to be releasably connected with the bracket 86.

An identical though oppositely disposed bracket 94 is attached to the end 76 of the U-shaped frame member 64 to facilitate the connection of a chain 96 therewith. An end 98 of the chain 96 is permanently attached to the bracket 94 and an end 100 is releasably connected therewith.

The chain 88 is passed through a lower eye 102 of the bail 30 and the chain 96 is passed through a lower eye 104 of the bail 28. If desired, the chains 88 and 96 could be passed through eyes 106 and 108, respectively, forming a portion of the elevator 32 or attached to the bails 28 and 30 above the eyes 102 and 104.

As is clearly illustrated in FIG. 2, the elevator 32 is formed from two portions 110 and 112 connected at adjacent ends by a hinge pin 114. The arrangement is such that the elevator 32 can be opened as illustrated in FIG. 2 or closed to engage the pipe, if the pipe has an external upset thereon, or to engage the sub 62 (see FIG. 1). To retain the elevator 32 in the closed position, the portion 110 includes a latch member 115 that is engageable with latch dog 116 on the portion 112. As is also shown in FIG. 2, the ends 72 and 76 of the U-shaped frame member 64 are spaced sufficiently so that the elevator 32 will be retained in the open position until manually closed.

Figure 3:
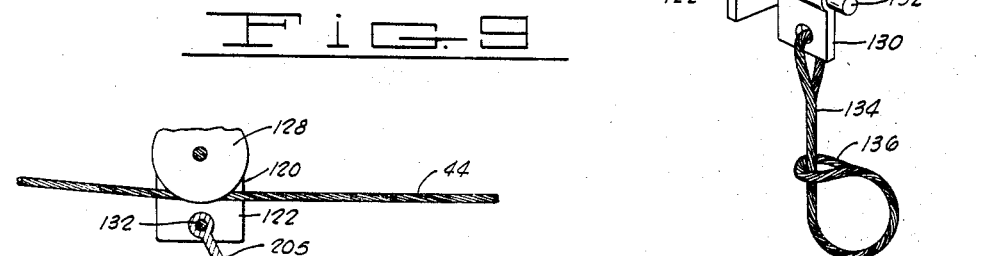
FIG. 3 is an enlarged elevational view, partly broken away, illustrating one embodiment of a pin block constructed in accordance with the invention.

Referring to FIG. 3, shown therein is a pin block generally designated by the reference character 118. As shown therein, the pin block 118 includes a U-shaped bracket 120 (a portion of which has been removed for clarity of illustration). The U-shaped bracket 120 has a pair of leg portions 122 and 124 disposed in parallel relationship. A bail or handle 126 is connected to the top of the U-shaped bracket 120 and is provided to facilitate handling the pin block 118. A pulley or sheave 128 is disposed between and journaled in the leg portions 122 and 124.

A connecting bracket 130 is disposed between the lower ends of the leg portions 122 and 124 and has its upper end encircling a pin 132 that is removably located in the U-shaped bracket 120. A relatively short length of cable 134 is connected with the bracket 130 at one end and has an eye 136 formed in the opposite end thereof encircling the bight portion of the cable 134 to form a noose or loop that is self-tightening.

*Operation*

As previously mentioned, the apparatus and methods of this invention may be most advantageously applied in the relatively large drilling rigs and when handling relatively heavy pipe, therefore, the following description is related to the handling of drill collars, which as is well-known in the drilling industry, are extremely heavy and do not have an external upset on either end thereof. Referring to FIG. 1, the apparatus is illustrated in the position that it occupies prior to removing the first drill collar and placing it on the pipe rack 48.

As may be seen therein, the sub 62 has been screwed into the upper end or box end of the drill collar 58 and the snubbing line 56 has been secured thereto. It should be pointed out that when handling the first drill collar 58, it is not necessary to attach the snubbing line 56 thereto.

The traveling block 24 is lowered by paying out the cable 20 from the draw works 22 until the elevator 32 can be latched to the sub 62. After the elevator 32 has been latched to the sub 62, the draw works 22 is actuated to raise the traveling block 24, the attached elevator and drill collar 58 upwardly in the derrick 12 until the lower end or pin end of the first drill collar 58 is above the rotary table 60. The slips (not shown) are then set to hold the remaining drill collars in the well. The drill collar 58 is then detached from the remaining sections of drill collar by conventional equipment available on the rig.

After the drill collar 58 has been broken from the remaining sections of drill collar, the pin block 118, which has been previously placed on the trolley line 44, is brought into proximity with the pin end of the drill collar 58 by slacking off on the catline 38. The cable 134 on the pin block 118 is then connected with the pin end of the drill collar 58 by looping it over the pin end of the drill collar 58.

Tension is taken in the snubbing line 56 and trolley line 44 by actuating the winch 54 so that the pin end of the drill collar 58 is moved relatively toward the V-door 52 of the derrick 12. Slacking off on the cable 20 permits the traveling block 24 to move downwardly. As the traveling block 24 moves downwardly, the drill collar 58 moves through the V-door 54 due to the movement of the pin block 118 outwardly along the trolley line 44.

As the drill collar 58 moves through the V-door 52, tension is slowly released in the catline 38 to permit the pin end of the drill collar 58 to engage the pipe rack 48 near its juncture with the lower end of the ramp 50 as shown in FIG. 4. While the foregoing operation has been taking place, a second sub 62a is placed in the upper end of the next section of drill collar 58a suspended in the rotary table 60 as shown in FIG. 4. Thus, it can be appreciated that the apparatus is disposed substantially as shown in FIG. 4.

If the snubbing line 56 has not been previously connected to the upper end of the drill collar 58, it is threaded through the guide 34 and attached to the upper end thereof. Tension is then taken in the snubbing line 56 and the elevator 32 is unlatched from the sub 62. The sub 62 is removed from the upper end of the drill collar 58 and moved to the vicinity of the center of the rig floor 14 for use with the next section of drill collar.

The traveling block 24 is raised to lift the elevator 32 while tension in the snubbing line 56 is slowly released to permit the extremely heavy traveling block 24 to swing slowly and under complete control toward the sub 62a as is clearly shown in FIG. 5. It should also be pointed out that, during the movement of the unlatched elevator 32 toward the sub 62a, the guide 34 retains the elevator 32 in the unlatched position as described in connection with FIG. 2. Upon reaching the vicinity of the sub 62a, the elevator 32 is latched thereon as previously described and as shown in FIG. 6.

To complete the movement of the drill collar 58 onto the pipe rack 48, tension is taken in the catline 38 and the attached trolley line 44 to lift the pin end of the drill collar 58 upwardly from the ramp 50 through the attached pin block 118. Tension is also taken in the snubbing line 56 to hold the upper end of the drill collar 58. To move the drill collar 58 relatively outwardly along and onto the pipe rack 48, tension is slowly released in the snubbing line 56 through the operation of the winch 54 to permit the drill collar 58 to move outwardly along the trolley line 44 toward the remote end of the pipe rack 48.

Upon reaching the desired position along the pipe rack 48, tension is relaxed in the trolley line 44 to permit the pin end of the drill collar 58 to engage the pipe rack 48 and, simultaneously, tension is relaxed in the snubbing line 56 to permit the drill collar to fully engage or come to rest on the pipe rack 48. From the foregoing, it can be seen that the entire operation of racking the drill collar 58 has been performed under complete control and with a minimum of manipulation, thereby providing a method and apparatus that provides quick, efficient, and safe racking of the heavy drill collars and complete control of the heavy traveling block 24 and elevator 32.

To complete the operation, the pin block 118 is released from the drill collar 58 and the snubbing line 56 is disconnected therefrom. The snubbing line 56 is connected to the pin block 118 and tension taken in the snubbing line 56 to pull the end of the snubbing line and the attached pin block 118 to the rig floor. After reaching the rig floor 14, the snubbing line 56 is disconnected from the pin block 118 and connected to the upper end of the next section of drill collar 58a. The foregoing procedure is repeated until each section of drill collar has been moved into position on the pipe rack 48.

To return the drill collars 58, 58a, etc. to the rig floor 14 from the pipe rack 48, a plurality of the drill collars are positioned on the ramp 50 as illustrated by the drill collar 58 in FIG. 7. The snubbling line 56, which has been previously attached to the upper end of the drill collars, is connected to the pipe rack 48 at some distance from the ramp 50 to provide stability to control the movement of the block 24.

With the snubbing line 56 connected in the described manner, it can be seen that tension taken in the snubbing line 56 causes the elevator 32 and traveling block 24 to move toward the V-door 52, that is, toward the drill collars positioned on the ramp 50. The elevator 32 is lowered along the snubbing line 56 until it is in position to be latched on the sub 62a screwed into the drill collar 58a. After the elevator 32 has been attached to the sub 62a, the traveling block 24 is raised, lifting the drill collar 58a therewith.

Tension is maintained in the snubbing line 56 as the drill collar 58a is raised until the lower end thereof is above the upper end of a drill collar 58b suspended in the well by the rotary table 60. As the pin end of the drill collar 58a rises above the upper end of the drill collar 58b, the tension is relaxed in the snubbing line 56 to permit the traveling block 24, elevator 32 and attached drill collar 58a to swing slowly toward the center of the rig floor 14 until it is positioned over the drill collar 58b. The traveling block 24 is then lowered to permit the drill collar 58a to be attached to the drill collar 58b by conventional means on the drilling rig 10. After the connection has been made between the drill collar 58a and the drill collar 58b, the slips (not shown) in the rotary table 60 are released and the traveling block 24 lowered to lower the drill collars 58a and 58b into the well.

After the collars 58a and 58b have been lowered into the well, the slips (not shown) are again set to suspend the collars in the rotary table 60. The elevator 32 is then unlatched from the sub 62a and tension slowly taken in the snubbing line 56 while simultaneously lowering the traveling block 24 to move the elevator 32 toward the V-door 52 and into engagement with the sub 62 that is screwed into the top of the drill collar 58. After the elevator 32 is latched to the sub 62, the foregoing described procedure is repeated to move the drill collar 58 into position for attachment with the upper end of the drill collar 58a. The foregoing procedure is then repeated until all or the desired number of the drill collars have been connected in the drilling string.

Occasionally during the drilling of a well, it becomes necessary to remove the rotary table 60 from the rig floor 14. The rotary table 60 is extremely heavy and occupies a relatively large space in the rig floor 14 leaving a very large opening therein when removed. Due to the size and weight of the rotary table and due to the opening in the rig floor 14, it is extremely dangerous to remove the rotary table by procedures previously utilized.

With the apparatus of this invention rigged as described in connection with FIG. 7, that is, with the snubbing line 56 extending through the guide 34 and attached to the pipe rack 48, it is possible to extend a chain through the lower eyes 102 and 104 of the bails 28 and 30, respectively, and attach the chain to the rotary table 60. With this arrangement, the traveling block 24 is then elevated by the draw works 22, lifting the rotary table 60 from the rig floor 14.

When the rotary table 60 has cleared the rig floor 14, tension is taken in the snubbing line 56 by the winch 54, moving the rotary table 60 and traveling block 24 toward the V-door 52. The traveling block 24 is then lowered to either position the rotary table 60 onto the rig floor 14 or to move it completely off the rig floor 14 through the V-door 52 as desired. The movement of the rotary table 60 with the apparatus described effectively eliminates the need for any of the drilling crew to be in the immediate vicinity of the rotary table 60, thus eliminating another source of danger to the rig crew. The rotary table 60 can be replaced in the rig floor 14 by reversing the foregoing procedure.

Another service application wherein the apparatus constructed in accordance with the invention can be advantageously utilized is illustrated in FIG. 8. As shown therein, the snubbing line 56 extends through the guide 34 which is connected with the elevator 32 as previously described. The end of the snubbing line 56 is attached to the pipe rack 48 as described in connection with FIG. 7.

The elevator 32 is connected with the upper end of a pipe 138 that has its lower end connected with a short section of a well tool or pipe 140. As shown in dash lines in FIG. 8, the end 142 of the pipe 140 is, for one reason or the other, extended only a short distance into the slips (not shown) and the rotary table 60. Since the end 142 of the pipe 140 does not extend for an appreciable distance through the rotary table into the well, it is rather difficult to disconnect the pipe 138 therefrom. Due to the extent to which the pipe 138 projects upwardly, rather large bending forces are exerted by the cables 144 and 146 on the pipe 138 through the tongs 148 and 150 that are attached to the cables 144 and 146, respectively. The tongs 148 and 150 are only schematically illustrated but are well known to those skilled in the well drilling art. The cables 144 and 146 and tongs 148 and 150 are arranged so that a force or pull exerted on the cables 144 and 146 tends to rotate the pipe 138 relative to the pipe 140 to disconnect or unscrew the pipes.

Tension is taken in the snubbing line 56, thereby holding the upper end of the pipe 138 through the elevator 32 against movement in the direction of the pull of the cables 144 and 146. Thus, it is possible to utilize the guide 34 in conjunction with the snubbing line 56 to support the upper end of the pipe 138, opposing the force exerted on the lower end 142 of the pipe 140 and, thereby, enabling the rig crew to separate the pipe 138 from the pipe 140.

From the foregoing detailed description of the apparatus constructed and methods performed in accordance with the invention, it can be seen that the guide 34 in conjunction with various cable arrangements is capable of increasing the speed, efficiency, and safety in performing a number of difficult and dangerous operations on the drilling rig 10. Naturally, there are many more uses for the guide 34 than those previously described but it is believed that they will be readily apparent to those familiar with the art of drilling wells.

Figure 9:
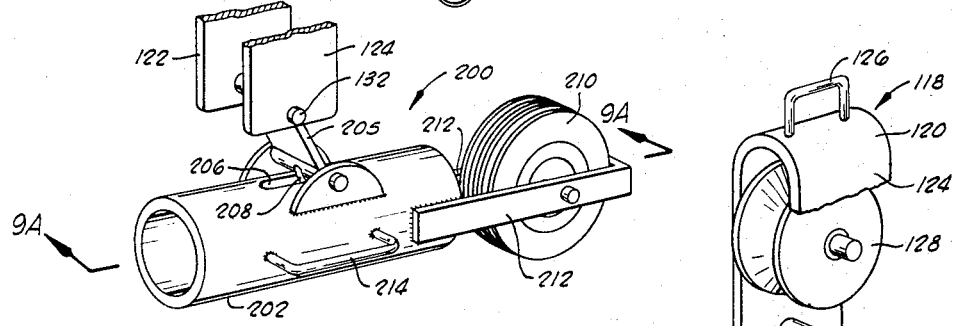
FIG. 9 is an enlarged pictorial view illustrating another embodiment of pin block also constructed in accordance with the invention.

Embodiment of FIG. 9

Sometimes the pipe or drill collars being handled on the rig are of such great weight that it is not practical to lift the pin end thereof completely free of the pipe rack 48 when moving the drill collar into the racked position. When handling pipe of such great weight, the apparatus illustrated in FIG. 9 and generally designated by the reference character 200 greatly facilitates the handling thereof.

Figure 9A:
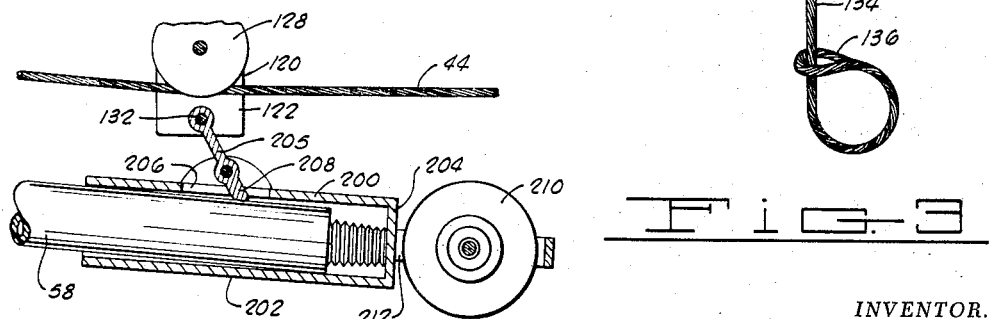
FIG. 9A is a vertical cross-sectional view of the pin block of FIG. 9 taken substantially along the line 9A—9A of FIG. 9.

As illustrated in FIG. 9 and in FIG. 9A, a tubular member 202 having a closed end 204 (see FIG. 9A) is pivotally connected with a bracket 205 that extends upwardly therefrom into pivotal connection with the leg portions 122 and 124 of the pin block 118. As readily apparent from the drawings, the pin 132 is removed from the leg portions 122 and 124 and the bracket 130 is removed therefrom. The bracket 204 is then inserted in lieu of the bracket 130 and the pin 132 replaced to pivotally connect the bracket 205 with the leg portions 122 and 124.

The tubular member 202 includes a slot 206 formed in the upper side thereof that is sized to receive a cam member 208 that is connected with the bracket 205. The apparatus 200 also includes a rotatable wheel 210 that is journaled in a U-shaped member 212 having each end connected with the tubular member 202. To facilitate the handling of the apparatus 200, a pair of handles 214 are provided on the exterior of the tubular member 202. Only one handle 214 is shown in FIG. 9, but it should be understood that an identical handle is located on the opposite side of the tubular member 202.

The tubular member 202 is sized to receive the pin end of the drill collar 58 as illustrated in FIG. 9A. When tension is taken in the trolley line 44, an upward force is exerted on the pulley 128 mounted in the U-shaped bracket 120, pivoting the bracket 205 relatively about the pin 132 and the pivotal connection between the bracket 205 and the tubular member 202. The pivotal movement of the bracket 205 moves the cam member 208 thereon into holding engagement with the exterior of the drill collar 58. Due to the engagement of the cam member 208 with the drill collar 58, the drill collar 58 is securely retained in the tubular member 202.

When the drill collar 58 with the apparatus 200 mounted thereon is positioned on the ramp 50, the U-shaped member 212 engages the rack 48 to hold the drill collar 48 on the ramp 50. The wheel 210 is sufficiently large so that, as tension is taken in the trolley line 44 and tension is released slowly in the snubbing line 56 (see FIG. 6) that is attached to the top end of the drill collar 58 as previously described, the wheel 210 engages the surface of the pipe rack 48, supporting a portion of the weight of the drill collar 58 so that the trolley line 44 does not have to lift the drill collar 58 completely free of the pipe rack 48. Manifestly, the rolling engagement of the wheel 210 with the pipe rack 48 reduces the load of the drill collar 58 on the trolley line 44.

It should be understood that the embodiments of the apparatus and the methods described hereinbefore for using the apparatus are presented by way of example only and that many modifications and changes can be made therein without departing from the spirit of the invention or from the scope of the annexed claims.

What I claim is:

1. A guide for use in handling pipe and the like during the drilling of a well, said guide comprising:
   a frame member having a generally U-shaped configuration;
   a pair of plates arranged in parallel, spaced relation, each having one end connected with said frame member relatively near the bottom of the U-shape;
   a pair of angularly disposed members, each having one end connected with a respective one of the other ends of said plates and having a second end connected with a respective end of said frame member;
   a pulley disposed between said plates and journaled therein; and,
   a pair of chains, one said chain having both ends connected with one of the ends of said frame member and the other said chain having both ends connected with the other end of said frame member.

2. The guide of claim 1 and also including a pair of support cables, each of said cables having one end connected with said frame member adjacent the connection between said plates and frame member; and, wherein each of said chains has one end releasably connected with the respective end of said frame member.

3. A guide for use in handling pipe and the like on well drilling including a vertically extending derrick, a traveling block flexibly suspended in the derrick, a pair of bails suspended by the traveling block, an elevator attached to the lower end of the bails for gripping the pipe, a powered winch, and a cable having one end operably engaged with the winch and having a bight portion suspended in the derrick and the other end connected to the rig, said guide comprising:
   a frame member having a generally U-shaped configuration;
   a pair of spaced, parallelly disposed plates, each having one end connected with said frame member relatively near the bottom of the U-shape;

a pair of angularly disposed members, each having one end connected with a respective one of the other ends of said plates and having a second end connected with a respective end of said frame member;

a pulley disposed between said plates and journaled therein, said pulley arranged to operably engage the cable; and, a pair of chains, each chain having both ends connected with one of the ends of said frame member, said chains being adapted to be connected with the lower ends of the bails adjacent the connection of the bails with the elevator whereby said guide holds the bails in spaced relation thereby retaining the elevator in the open or unlatched position until the elevator is manually latched on the pipe.

4. The guide of claim 3 and also including:

a pair of support cables, each of said cables having one end attached to said frame member adjacent the connection between said plates and frame member and having the opposite end adapted to be connected with one of the bails adjacent the connection between the bails and traveling blocks whereby said frame member is disposed substantially perpendicularly to the bails.

5. Pipe handling apparatus for use on a drilling rig including a derrick having a traveling block flexibly suspended from the upper end of the derrick above a derrick floor, an elevator suspended from the traveling block by a pair of bails, an inclined ramp extending from the derrick floor to a horizontally disposed pipe rack, said apparatus comprising:

a winch;

a cable having one end portion engaging said winch, a bight portion suspended in the derrick between the derrick floor and the top of the derrick, and the other end portion adapted to be connected to the drilling rig;

power means operably connected with said winch for varying the tension in said cable;

guide means connected with the bails adjacent the connection between the bails and elevator, said guide means engaging said cable and movable thereon as the traveling block moves upwardly and downwardly in the derrick, whereby tightening said cable causes said traveling block and elevator to move relatively toward the pipe rack;

a second winch;

power means operably connected with said second winch;

a second cable having one end portion connected with said second winch, a bight portion suspended in the derrick between the derrick floor and top, and the other end portion connected with the end of the pipe rack remote from the derrick; and a second guide member moveably mounted on the second cable and arranged to supportingly engage the pinned end of a pipe, whereby lowering the traveling block and tightening the second cable moves the pipe along the pipe rack and relatively away from the derrick.

6. The apparatus of claim 5 wherein said guide means includes:

a frame member having a generally U-shaped configuration;

a pair of spaced, parallely disposed plates, each having one end connected with said frame member relatively near the bottom of the U-shape;

a pair of angularly disposed members, each having one end connected with a respective one of the other ends of said plates and having a second end connected with a respective end of said frame member;

a pulley disposed between said plates and journaled therein; and, a pair of chains, each said chain having both ends connected with a respective one of the ends of said frame member.

7. The apparatus of claim 5 wherein said second guide means includes:

a U-shaped bracket having a pair of parallely disposed leg portions;

a pulley rotatably mounted between said leg portions and operably engaging said second cable; and, support means adapted to engage the pin end of the pipe, said means being connected to the ends of said leg portions.

8. The apparatus of claim 5 wherein said support means comprises an elongated flexible member having one end connected with said leg portions, and having the other end slidingly connected with a bight portion of said flexible member to form a self-tightening loop in said flexible member adapted to receive the pin end of the pipe.

9. The apparatus of claim 5 wherein said support means includes:

a tubular member having one end closed and a slot formed in one side, said tubular member being adapted to receive the pin end of the pipe therein;

a rotatable wheel connected with said tubular member adjacent said closed end; and, a cam member pivotally connected with said tubular member, one end of said cam member being disposed in said slot and adapted to engage the pipe and the other end of said cam member being pivotally connected to the ends of said leg portions.

10. A method of handling pipe on a well drilling rig including a vertically disposed derrick, a traveling block flexibly suspended in the derrick, an elevator or latch arranged to be connected to the pipe, support means suspending the elevator from the traveling block, holding means adapted to suspend sections of pipe in the well, a horizontally disposed elongated pipe rack adjacent the derrick, an inclined ramp extending from the derrick to the pipe rack, a pair of winches on said derrick, and first and second cables movably suspended in the derrick, each being connected with one of the winches, the method including the steps of:

connecting a first guide member to the support means in operable engagement with the first cable;

connecting the other end of said first cable to the pipe rack;

applying tension in said first cable while lowering the traveling blocks, whereby the traveling block and attached elevator are moved toward the ramp;

latching the elevator on a pipe disposed on the ramp;

holding tension in said first cable while raising the traveling block and connected pipe; and, releasing the tension slowly in said first cable to permit the traveling block and connected pipe to move to a position over the holding means, whereby said pipe can be connected with the pipe sections suspended in the well by said holding means.

11. The method of claim 10 and also including the steps of:

connecting the second cable near the end of the pipe rack most remote from the derrick;

mounting a second guide member on said second cable;

connecting said first cable to a pipe disposed on the ramp;

disconnecting the elevator from the pipe and connecting it with the pipe section suspended in the well;

connecting said second guide member with the lower end of the pipe on said ramp; and, applying tension in said second cable to lift the lower end of the pipe and simultaneously slacking off on the first cable whereby said pipe is moved outwardly along said pipe rack.

12. The method of claim 11 and also including the steps of:

disconnecting said first cable and second guide member from the pipe on said pipe rack;
connecting said first cable to the pipe section below said elevator;
raising the traveling block to lift said pipe section and disconnecting said pipe section from a subjacent pipe section held by said holding means;
connecting said second guide member to the pin end of said raised pipe section;
applying tension to said second cable and simultaneously lowering the traveling block to move said pipe section onto said ramp; and,
disconnecting said elevator and releasing tension slowly in said first cable to move said block and elevator toward said subjacent pipe section.

13. The apparatus of claim 5 wherein said guide means includes:
rigid frame means having first and second edge portions and an opening extending therethrough proximate said first edge portion;
a pulley journaled in said frame means and disposed in said opening; and,
a pair of connecting means attached in spaced relationship to said second edge portion.

References Cited

UNITED STATES PATENTS

| | | | |
|---|---|---|---|
| 804,635 | 11/1905 | Strohminger | 254—194 |
| 1,055,128 | 3/1913 | Brennan | 254—195 X |
| 2,082,169 | 6/1937 | McKissick | 254—193 |
| 2,425,292 | 8/1947 | McCoy | 214—2.5 |
| 2,453,963 | 11/1948 | Bercaw | 254—193 |
| 2,539,751 | 1/1951 | Olsen | 214—2.5 |
| 2,747,751 | 5/1956 | Stone et al. | 214—2.5 |
| 2,946,464 | 7/1960 | Guier | 214—2.5 |
| 2,966,994 | 1/1961 | Wolff | 214—2.5 |
| 3,174,273 | 3/1965 | Ehmann | 59—93 |
| 3,195,862 | 7/1965 | Sherman | 254—197 |

GERALD M. FORLENZA, *Primary Examiner.*

MARVIN A. CHAMPION, *Examiner.*

G. F. ABRAHAM, *Assistant Examiner.*